United States Patent [19]
Morris et al.

[11] 3,912,672

[45] Oct. 14, 1975

[54] ACRYLATE RUBBER VULCANIZABLE COMPOSITIONS

[75] Inventors: Roger E. Morris, Cuyahoga Falls; Harold Tucker, Brecksville, both of Ohio

[73] Assignee: The B. F. Goodrich Company, Akron, Ohio

[22] Filed: Mar. 21, 1974

[21] Appl. No.: 453,278

Related U.S. Application Data

[63] Continuation of Ser. No. 272,849, July 18, 1972, abandoned.

[52] U.S. Cl.... 260/23 AR; 260/23 TN; 260/47 UA; 260/63 UY; 260/66; 260/78.5 R; 260/79.7; 260/80.7; 260/80.73; 260/80.76; 260/80.8; 260/859 R

[51] Int. Cl.$^2$.................... C08F 8/40; C08F 8/42

[58] Field of Search...... 260/23 AR, 23 TN, 63 UY, 260/78.5 R, 79.7, 80.73, 80.76, 80.8, 859 R, 47 UA

[56] References Cited

UNITED STATES PATENTS

| | | | |
|---|---|---|---|
| 3,296,175 | 1/1967 | Fantl et al. | 260/29.6 |
| 3,488,331 | 1/1970 | Jorgenson | 260/80.76 |
| 3,624,058 | 11/1971 | Jorgenson | 260/86.1 |
| 3,732,190 | 5/1973 | Balle et al. | 260/78.5 R |

*Primary Examiner*—Stanford M. Levin
*Attorney, Agent, or Firm*—Alan A. Csontos

[57] ABSTRACT

Acrylate rubbers having both halogen and carboxyl cure sites are vulcanized using an alkali metal salt of a carboxylic acid or an organo-phosphoric acid. The cure can be catalyzed by a quaternary ammonium salt or an amine. The vulcanized compositions exhibit low press-cured and post-cured compression set.

15 Claims, No Drawings

ACRYLATE RUBBER VULCANIZABLE COMPOSITIONS

This is a continuation of application Ser. No. 272,849, filed July 18, 1972, now abandoned.

BACKGROUND OF THE INVENTION

Acrylate rubbers exhibit very favorable qualities of weatherability, high temperature serviceability, and good oil resistance. These qualities make the rubbers useful for under-the-hood automotive applications and out-of-door applications. Their use is limited by the tendency of the vulcanizates to post-cure during use. This results in property change and in some cases in failure of the article. To overcome these problems, the acrylate rubber vulcanizates are purposely postcured, often as long as 24 hours or more, to obtain a more complete cure. This is shown by a reduced compression set. It would be of great advantage to the industry to reduce the time required for, or eliminate the need of, post-cure for the acrylate rubber vulcanizates.

Much effort has gone into the development of both faster and more efficient cures of acrylate rubbers. An article in Rubber Chemistry and Technology, Vol. 44, No. 2 (1971), traces the more recent efforts. Various cure sites and cure systems have been evaluated; see U.S. Pat. Nos. 3,288,763; 3,324,088; 3,337,492; 3,435,010; 3,450,681; and 3,458,461. However, the need for a long post-cure has not been eliminated, and improved vulcanizates are desired.

SUMMARY OF THE INVENTION

Compositions comprising an acrylate rubber having both halogen and carboxyl cure sites and an alkali metal salt of a carboxylic acid or an organo-phosphoric acid are readily cured to vulcanizates having improved press-cure and post-cure compression set. The cure can be catalyzed by the use of a quaternary ammonium salt or an amine.

DETAILED DESCRIPTION

The acrylate rubbers are interpolymers comprising acrylate monomer(s), a reactive halogen-containing monomer, and a carbonyl-containing monomer.

The acrylate rubber contains from about 40% to about 99.8% by weight, based upon the weight of the polymer, of an acrylate of the formula

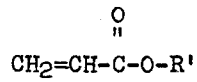

wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate; methoxyethyl acrylate, ethoxyethyl acrylate, butoxyethyl acrylate, ethoxypropyl acrylate, methylthioethylacrylate, hexylthioethylacrylate, and the like; and α and β-cyanoethyl acrylate, α,β and γ-cyanopropyl acrylate, cyanobutyl acrylate, cyanohexyl acrylate, cyanooctyl acrylate, and the like. Often mixtures of two or more monomers and/or types of acrylate monomers are employed.

Preferredly the rubber contains from about 65% to about 99.6% by weight of acrylates of the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like, and methoxyethyl acrylate, ethoxyethyl acrylate and the like. Both an alkyl acrylate and an alkoxyalkyl acrylate are used.

The rubber contains from about 0.1% to about 30% by weight of an active halogen-containing monomer. The halogen groups can be chlorine, bromine, or iodine. Examples of such monomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-(α-chloroacetoxymethyl)-2-norbornene, 5-(α,β-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

More preferredly, the rubber contains from about 0.2% to about 15% by weight of the active halogen-containing monomer. At this level, the halogen content is from about 0.1% to about 5% by weight of the rubber. Due to availability and cost, the chlorine-containing monomers are preferred.

The rubbers also contain from about 0.1% to about 20% by weight of a carboxyl-containing monomer. The monomer can be monocarboxylic or poly-carboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene ($CH_2$=C<) group. Examples of such are phenyl acrylate, cyclohexyl acrylate, methacrylates such as methyl methacrylate, ethyl methacrylate and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, vinyl toluene, and the like; vinyl nitriles such as acrylonitrile and methacrylonitrile; vinyl amides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene and diethylene glycol diacrylate.

The acrylate rubbers can be prepared using emulsion (latex), suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about −10°C. to about 100°C., whereas a more preferred range is from about 5°C. to about 80°C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile and the like; persulfate salts such as sodium potassium, and ammonium persulate, used alone or with redox systems; and the use of ultraviolet light with photo-sensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art.

The polymerization normally is continued until about 90% conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, and freeze agglomeration techniques. The rubber is then usually washed with water and dried.

The acrylate rubbers are solid elastomers having a dilute solution viscosity (DSV) of over 0.5 as measured on 0.2 gram of rubber in 100 ml. benzene at 25°C. Raw polymer Mooney values (ML-4, at 212°F.) are from about 20 to about 100.

The rubbers are admixed with cure ingredients and compounding ingredients using two-roll mills, internal mixers such as Banburys and extruders, and like equipment.

The acrylate rubbers can be vulcanized using known curatives. Examples of these curatives are the soap-sulfur systems such as potassium and sodium stearate, sodium acetate, and potassium tartate with sulfur or sulfur donors such as dipentamethylene thiuram hexasulfide; polyamines such as hexamethylene diamine, triethylene diamine, triethylene tetraamine, and the like; and ammonium-carboxylic acid salts such as ammonium benzoate, ammonium adipate, and ammonium stearate, used alone or with alkyl halides such as dodecyl bromide. A disadvantage of these curatives is their failure to develop low compression set after press-cure.

It has been found that the acrylate rubbers of this invention are vulcanized efficiently in the absence of sulfur using an alkali metal salt of a carboxylic acid or an organophosphoric acid. The press-cured and post-cured essentially sulfur-free vulcanizates exhibit comparatively lower compression set than known vulcanizate compositions. This is achieved at no loss of desirable acrylate properties.

The carboxylic acid metal salt is used at a level from about 0.5 part to about 7 parts by weight per 100 parts of rubber, and more preferredly from about 1 part to about 5 parts by weight. The metal is an alkali metal. The carboxylic acid is preferredly a monocarboxylic acid containing from 2 to about 24 carbon atoms. The acids may be unsaturated, and can contain hydroxy, ether, ester, or ketonic groups. Examples of such acids are acetic acid, propionic acid, isobutyric acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-b 3-octyl maleate, benzoic acid, phthalic acid, toluic acid, salicylic acid, naphthenic acid, and the like. More preferredly, the carboxylic acid contains from about 6 to about 20 carbon atoms. Examples of the more preferred monocarboxylic acids are octanoic acid, 2-ethyl hexanoic acid, decanoic acid, lauric acid, stearic acid, cinnamic acid, benzoic acid, toluic acid, naphthenic acid, and the like.

Preferredly the metal salt is a salt of an alkyl or of an aromatic monocarboxylic acid. Potassium and sodium are the preferred alkali metals. Examples of the more preferred carboxylic acid metal salts are sodium octanoate, potassium 2-ethyl hexanoate, sodium t-dodecanoate, sodium and potassium tetradodecanoate, sodium and potassium stearate, sodium and potassium benzoate.

The alkali metal salts of organo-phosphoric acids also may be used. These compounds are characterized by the structure

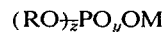

$$(RO)_{\overline{y}}PO_{y}OM$$

wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or a polyether as the condensation product of an organic acid or alcohol with ethylene oxide. Examples of these compounds are sodium salt of monophenyl phosphate, sodium salt of mono-p-tert-butyl phenyl phosphate, potassium salt of di-o-xenyl phosphate, sodium salt of mono-lauryl phosphate, sodium salt of dioctyl phosphate, potassium salt of distearyl phosphate, potassium salt of monododecyl-mono-benzyl phosphate, and sodium and potassium salts of mono- and di-alkylphenoxy poly(ethyleneoxy) ethyl phosphates. More preferredly M is sodium or potassium and R, when an alkyl radical, contains about 8 to about 18 carbon atoms, and when an aryl radical, contains 6 to about 14 carbon atoms.

The acrylate rubbers containing both halogen and carboxyl cure sites are readily cured without sulfur to vulcanizates having improved press-cured and post-cured compression set using an acid metal salt as the curative. Even further improvement is obtained and the rate of cure accelerated by using a nitrogen-containing catalyst. Such catalyst are quaternary ammonium salts and amines.

The quaternary ammonium salts are used at a level from about 0.01 part to about 5 parts by weight per 100 parts of rubber, and more preferredly from about 0.05 part to about 2 parts by weight. The compounds are ammonium salts in which all four hydrogen atoms have been replaced with organic radicals. The quaternary ammonium salts include the structure

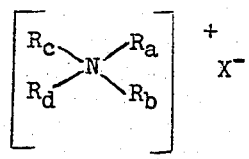

wherein $R_a$, $R_b$, $R_c$ and $R_d$ are hydrocarbon radicals containing 1 to 18 carbon atoms such as alkyl, aryl, alkaryl, and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S where at least two atoms are C; and X is an anion from an inorganic or organic acid wherein the acidic hydrogen is attached to halogen or oxygen. More preferredly X is an anion such as $Cl^-$, $Br^-$, $I^-$, $HSO_4^-$, $H_2PO_4^-$, $RCOO^-$, $ROSO_3^-$, $RSO^{3-}$, and $ROPO_3H^-$, and R is an alkyl or alkaryl radical containing 1 to 18 carbon atoms.

Examples of the quaternary ammonium salts are tetramethyl ammonium chloride, tetramethyl ammonium bromide, trimethyl ethyl ammonium iodide, trimethyl cetyl ammonium bromide, trimethyl benzyl ammonium benzoate, trimethyl benzyl ammonium chloride, trimethyl benzyl ammonium paratoluene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, methyl cetyl dibenzyl ammonium bromide, cetyl pyridinium chloride, dodecyl pyridinium bromide, lauryl pyridinium sulfate, and the like.

The amine catalysts are strong amines, having a dissociation ($-\log K$) constant of below 10 (See Lange's Handbook of Chemistry, 10th Edition, McGraw-Hill Book Co., N.Y. (1967) Page 1213). They are used at the same concentrations as the quaternary ammonium salts are used. The amines can be primary, secondary, or tertiary amines, but more preferredly are secondary or tertiary amines, or guanidines.

The secondary amines can be aliphatic or aromatic amines, cyclic methyleneamines, or heterocyclic amines. Examples of such amines are diisopropyl amine, dioctyl amine, dilauryl amine, dibenzyl amine, methylbenzyl amine, methyethanol amine, diethanol amine, imidazole pyrrolidine, piperidine, piperazine, morpholine, and the like. The more preferred secondary amines are the cyclic methyleneamines and the heterocyclic amines, containing 3 to 8 atoms in the ring.

The tertiary amines can be aliphatic or aromatic amines, cyclic methyleneamines, or heterocyclic amines. Examples of such amines are triethyl amine, triisopropyl amine, dimethyllbutyl amine, dimethylbenzyl amine, methyl dibenzyl amine, triethanol amine, N-methyl piperidine, N-methyl morpholine, triethylenediamine, quinuclidine, pyridine, 3-ethyl-4-methyl pyridine, 4,4'-dipyridyl propane, and the like. The more preferred tertiary amines are the cyclic methyleneamines and the heterocyclic amines containing 3 to 8 atoms in the ring.

Examples of the guanidines are guanidine, tetramethyl guanidine, dibutyl quanidine, diphenyl quanidine, diorthotolyl guanidine, dicyandiamide, and the like; and reaction products of guanidines with acyl chlorides, examples being 1,1,3,3-tetramethyl-2-acetyl guanidine and 1,1,3,3-tetramethyl-2-benzoyl guanidine.

The amines can be added in their natural form, or as amine/acid salts, or amine/isocyanate reaction products. An exception to this, of course, is the tertiary amines which can be added only in their natural state or as an amine/acid salt.

The amine/acid salts and amine/isocyanates reaction products are added at levels which yield the desired level of amine catalyst. For example, if the amine forms forty percent by weight of the compound, and 1 part by weight of amine is desired, the compounder would add 2.5 parts of the compound to the acrylate rubber.

The amine/acid salts are prepared by the reaction of the amine with a halogen acid, a phosphoric acid or partial phosphoric acid ester, partial ester of a sulfuric acid, or a carboxylic acid. Examples of such acids are hydrochloric acid, hydrobromic acid, phosphoric acid, octadecyl dihydrogen phosphate, dioctyl hydrogen phosphate, lauryl hydrogen sulfate, and carboxylic acids such as aliphatic acids, especially the fatty acids, and aromatic acids. The carboxylic acids can be mono- or poly-carboxylic acids containing 2 to about 24 carbon atoms. Examples of these acids are acetic acid, propionic acid, butanoic acid, hexanoic acid, octanoic acid, 2-ethyl hexanoic acid, dodecanoic acid, hexadecanoic acid, octadecanoic acid, maleic acid, crotonic acid, malonic acid, succinic acid, glutaric acid, azelaic acid, hydroxy acetic acid, glycolic acid, malic acid, acetoacetic acid, benzoic acid, phthalic acid, salicylic acid, and the like.

More preferredly, the acids are halogen acids, or mono-carboxylic acids or aromatic acids containing 6 to about 20 carbon atoms. Examples of such amine/acid salts are ethyl amine hydrochloride, dioctyl amine hydrobromide, dilauryl amine stearate, t-butyl amine benzoate, diethanol amine benzoate, piperidine hydrochloride, piperazine octonate, N-methyl pyridine-2-ethyl hexanoate, triethylamine hydrochloride, dimethyl benzyl amine phthalate, N-methyl piperidine benzoate, triethylenediamine dibenzoate, pyridine hydrochloride, 4,4'-dipyridyl propane dibenzoate, triphenyl guanidine hydrochloride, dicyandiamide caproate, and the like.

The amines can also be added as amine/isocyanate reaction products. The isocyanates can be mono-, di-, or polyisocyanates. Examples of the isocyanates are hexyl isocyanate, lauryl isocyanate, octadecyl isocyanate, phenyl isocyanate, 2,4- and 2,6- toluene diisocyanate, p-phenylene diisocyanate, bitolyl diisocyanate, diphenylmethane-p,p'-diisocyanate, diphenylmethane triisocyanate, and the like. The more preferred isocyanates are the aromatic isocyanates.

Examples of amine/isocyanate combinations are dioctyl-amine-octadecyl isocyanate, dibenzylamine-hexyl isocyanate, morpholine-phenyl isocyanate, diphenylguanidine-tolyl isocyanate, dicyandiamide-octadecyl isocyanate, diethylamine-toluene diisocyanate, dibutylamine-diphenylmethane diisocyanate, piperidine-bitolyl diisocyanate, pyrrolidine-diphenylmethane-p,p'-diisocyanate, and the like.

The acrylate rubbers can be admixed with many other rubber compounding ingredients. Examples of such ingredients are fillers such as the carbon blacks, calcium sulfates, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like, petrolium oils, castor oil, tall oil, glycerin, and the like; antioxidants, and stabilizers such as phenyl-β-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl)isocyanurate, tetrakis-methylene-3(3',5'-di-t-butyl-4'-hydroxyphenyl)propionate methane, distearyl thiodipropionate, tri(-nonylatedphenyl)phosphite, and the like; and other ingredients such as pigments, tackifiers, flame retardants, fungicides, and the like.

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 8 hours at a temperature from about 300°F. to about 375°F.

The novel compositions develop rapid and stable cures. Full property development is achieved faster than with previously known compositions. This is evidenced by the lower compression set values obtained after press-cure and post-cure. The vulcanizates were evaluated as to their plied disk compression set (ASTM D395V), tensile and elongation (ASTM D412), hardness (ASTM D676-durometer A), and Gehman Freeze (D1053). Cure times were determined following ASTM D1646, using a Mooney Viscometer at 250°F. with a large rotor, or using a Monsanto Rheometer or a B.F.G. Cone Curometer as described in U.S. Pat. No. 3,494,172.

The vulcanizates are useful in many applications where weatherability, high temperature serviceability, and oil resistance are required. Such applications are under-the-hood automotive parts such as gaskets, seals, packings, belting and hosing, and out-of-doors applications such as weatherstripping, sealants, and hosing.

The following examples serve to more fully illustrate the invention.

EXAMPLE I

A polymer containing ethyl acrylate, n-butyl acrylate, methacrylic acid, and vinyl benzyl chloride was prepared using standard emulsion polymerization techniques. The recipe used is as follows:

| Water, grams | 2400 |
|---|---|
| n-Butyl acrylate, grams | 1420 |
| Ethyl acrylate, grams | 380 |
| Methacrylic acid, grams | 5.7 |
| Vinyl benzyl chloride, grams | 20 |
| Gafac PE 510[1], grams | 35 |
| Daxad 17[2], grams | 9.5 |
| Sodium sulfate, grams | 5.7 |
| Diisopropylbenzene hydroperoxide, milliliters[3] | 2.8 |
| SFS[4], milliliters[5] | 3.6 |
| Sequestrene NaFe[6], milliliters[7] | 2.0 |
| $Na_2S_2O_4$, milliliters[8] | 15 |

[1]alkylphenoxy poly(ethyleneoxy)ethyl phosphate
[2]polymerized alkyl naphthalene sulfonic acid
[3]1.4 milliliters catalyst in 10 milliliters acetone
[4]sodium formaldehyde sulfoxalate
[5]5% by weight in water
[6]sodium ferric ethylenediamine tetraacetic acid
[7]5% by weight in water
[8]0.2% by weight in water The Gafac PE 510 was mixed in 200 grams of water and adjusted to a pH of 6.5. The ethyl acrylate, n-butyl acrylate, methacrylic acid, and vinyl benzyl chloride were mixed together. 2200 grams of water was charged to a vessel which had been previously evacuated and purged with nitrogen gas. One-half of the Gafac solution was added, followed by 190 grams of the monomer solution, the Daxad 17 and the sodium sulfate. The reactor mix was cooled to 17°C. and the hydroperoxide, SFS, Sequestrene NaFe, and $Na_2S_2O_4$ added to initiate the reaction. Polymerization temperature was maintained at about 20°C. to 25°C. The remaining monomer solution was proportioned into the reactor over a 7-hour period. At 3.5 hours into the run, the remaining one-half of the Gafac solution was added. Total polymerization time was 10 hours. Percent conversion of monomers to polymer was above 95%. The emulsion was coagulated using a 25% by weight solution of NaCl in water, and methanol. The isolated polymer was washed with water and dried. The polymer was a rubber having about a 30 raw polymer Mooney value (Ml-4, 212°F.).

The Example demonstrates that the polymers employed in this invention are readily prepared using standard polymerization techniques. The polymers are just as easily prepared using suspension, solution, or bulk polymerization procedures and techniques.

EXAMPLE II

Ethyl acrylate rubbers containing methacrylic acid and vinyl benzyl chloride as cure site monomers were vulcanized using a soap/quaternary ammonium salt cure system. A soap/sulfur cure of an ethyl acrylate/vinyl benzyl chloride rubber was run for a comparison. The rubber compositions in percent by weight were:

|  | A | B | C |
|---|---|---|---|
| Ethyl acrylate | 97.1 | 96.9 | 97.4 |
| Vinyl benzyl chloride | 2.4 | 2.4 | 2.6 |
| Methacrylic acid | 0.5 | 0.7 | — |

The recipes used were as follows (in parts by weight):

|  | 1 | 2 | 3 | 4 |
|---|---|---|---|---|
| Rubber A | 100 | — | — | — |
| Rubber B | — | 100 | 100 | — |
| Rubber C | — | — | — | 100 |
| N550 black | 65 | 65 | 65 | 65 |
| Acrawax C[1] | 2 | 2 | 2 | 2 |
| Potassium stearate | 3.0 | 3.0 | 2.8 | 3.0 |
| Sulfur | — | — | — | 0.3 |
| Fixanol[1] | 0.83[3] | 0.2 | — | — |
| Arquad[2] S-50 | — | — | 0.3 | — |
| Press cure conditions |  |  |  |  |
| Time, minutes | 20 | 20 | 10 | 8 |
| Temperature, °F. | 350 | 350 | 350 | 338 |
| Tensile, psig | 2380 | 1790 | 2320 | 1900 |
| Elongation, percent | 180 | 165 | 195 | 430 |
| Compression set, percent |  |  |  |  |
| 70 hours at 300°F. | 47 | 51 | 61 | 94 |
| Tempered data |  |  |  |  |
| hours at 350°F. | 8 | 5 | 8 | 8 |
| Tensile, psig | 2280 | 1520 | 2150 | 1940 |
| Elongation, percent | 135 | 125 | 130 | 210 |
| Compression set, percent |  |  |  |  |
| 70 hours at 300°F. | 14 | 25 | 27 | 56 |

[1]dodecyl pyridinium bromide
[2]trimethyl alkyl ammonium chloride
[3]50 percent by weight on precipitated silica
[4]synthetic wax The halogen- and carboxyl-containing rubbers, samples 1, 2 and 3, readily cured using a soap/quaternary ammonium salt system. Sample 4, a halogen-containing rubber, vulcanized using a soap/sulfur system, cured slower as evidenced by the much higher compression set of the sample. The novel compositions had compression sets after the press-cure comparable to sample 4 after 8 hours of tempering. This example demonstrates that the novel vulcanizable compositions obtain a given state of cure much faster than previously known compositions.

EXAMPLE III

Rubbers containing ethyl acrylate, methacrylic acid, and 5-chloroacetoxymethyl-2-norbornene were vulcanized using a soap-quaternary ammonium salt cure system. For comparison, a rubber containing ethyl acrylate and 5-chloroacetoxymethyl-2-norbornene was vulcanized using a soap/sulfur cure system. The rubber compositions were, in weight percent:

|  | A | B | C | D |
|---|---|---|---|---|
| Ethyl acrylate | 97.8 | 97.8 | 97.3 | 98.3 |
| Methacrylic acid | 1.0 | 0.6 | 0.9 | — |
| 5-chloroacetoxy-methyl-2-norbornene | 1.2 | 1.6 | 1.7 | 1.7 |
| The cure recipes were as follows: | 1 | 2 | 3 | 4 |
| Rubber A | 100 | — | — | — |
| Rubber B | — | 100 | — | — |
| Rubber C | — | — | 100 | — |
| Rubber D | — | — | — | 100 |
| N550 Black | 65 | 65 | 65 | 65 |
| Acrawax C | — | 2 | — | — |
| Potassium stearate | 3.0 | 3.0 | 3.0 | 3.0 |
| Sulfur | — | — | — | 0.3 |
| Arquad S-50 | — | — | 0.2 | — |
| Fixanol | 1.0 | 0.4 | — | — |
| Press-cure conditions |  |  |  |  |
| Time, minutes | 20 | 20 | 10 | 10 |
| Temperature, °F. | 350 | 350 | 350 | 350 |
| Tensile, psig | 1800 | 1550 | 1820 | 1320 |
| Elongation, % | 225 | 165 | 215 | 220 |
| Compression set, % 70 hours at 300°F. | 63 | 42 | 60 | 94 |
| Tempered conditions |  |  |  |  |
| time, hours | 3 | 8 | 8 | 8 |
| temperature, °F. | 350 | 350 | 350 | 350 |
| Tensile, psig | 2050 | 1650 | 1920 | 1450 |
| Elongation, % | 150 | 125 | 130 | 200 |
| Compression set, % 70 hours at 300°F. | 50 | 21 | 28 | 46 |

The data shows that the unique vulcanizable compositions, samples 1, 2 and 3, press-cured more quickly and to a more fully developed cure than the soap/sulfur cured, halogen-containing rubber, sample 4. Sample 2 had press-cure properties equal to or better than sample 4 even after sample 4 was tempered for 8 hours at 350°F. The fast cure of the novel compositions enables a manufacturer to increase his output by expending much less time during cure and tempering to obtain a desired state of cure.

EXAMPLE IV

A rubber comprising 96.7 percent of ethyl acrylate, 2.7 percent of 2-chloroethyl acrylate, and 0.6 percent of methacrylic acid was cured using a soap/quaternary ammonium salt system. The recipe used and the data obtained were as follows:

| Rubber | 100 |
|---|---|
| N550 black | 60 |
| Potassium stearate | 2.8 |
| Fixanol, 50% by weight on precipitated silica | 2.5 |
| Cured 20' at 350°F. |  |
| Tensile, psig | 1740 |
| Elongation, percent | 360 |
| Compression set, percent 70 hours at 300°F. | 60 |
| Tempered 8 hours at 350°F. |  |
| Tensile, psig | 1800 |
| Elongation, percent | 140 |
| Compression set, percent 70 hours at 300°F. | 23 |

This example shows the use of 2-chloroethyl acrylate as the halogen-containing monomer. Although the reactivity of the halogen group varies with the monomer, the soap/quaternary ammonium salt system provides enhanced cure development in all cases.

EXAMPLE V

An acrylate rubber containing 48.7 percent by weight of n-butyl acrylate, 48.7 percent by weight of methoxyethyl acrylate, 0.6 percent by weight of methacrylic acid, and 2.0 percent by weight of 5-chloroacetoxymethyl-2-norbornene was vulcanized using only a fatty acid metal salt as the curative. The recipe and data were as follows:

|  | 1 | 2 | 3 |
|---|---|---|---|
| Rubber | 100 | 100 | 100 |
| N326 black | 80 | 80 | 80 |
| Potassium stearate | 2.25 | 2.25 | 2.4 |
| Sodium stearate | 0.75 | 0.75 | — |
| Stearic acid | 1.0 | — | — |
| Press-cure 10" at 350°F. |  |  |  |
| Tensile, psig | 1180 | 1500 | 950 |
| Elongation, % | 160 | 170 | 120 |
| Hardness, Duro A | 65 | 67 | 65 |
| Compression set, % 70 hours at 300°F. | 77 | 75 | 70 |

The cure data shows that the rubbers were substantially cured without the need of sulfur. A short post-cure would readily lower the compression sets of the rubbers. The use of a quaternary ammonium salt or an amine catalyst increases the rate of cure.

EXAMPLE VI

A rubber containing 96.7 percent by weight of ethyl acrylate, 2.7 percent by weight of 2-chloroethyl acrylate, and 0.6 percent by weight of methacrylic acid was vulcanized using the recipe: 100 parts rubber, 65 parts N550 black, 2 parts Acrawax C, 2.8 parts potassium stearate, and 1.5 parts 4,4'-dipyridyl propane. The composition was press-cured 20 minutes at 302°F. Tensile was 1880 psig, elongation was 190 percent, hardness was 77, and compression set (70 hours at 300°F.) was 75 percent. After a post-cure of 5 hours at 350°F., the compression set was 36 percent. The cured vulcanizate had an oil swell of 13 percent after 3 days at 300°F. in ASTM No. 3 oil, and had a Genman Freeze point of −20°C. The example demonstrates the use of a tertiary amine as a cure catalyst.

EXAMPLE VII

A rubber containing 97.8 percent by weight of ethyl acrylate, 1.6 percent by weight of 5-chloroacetoxymethyl-2-norbornene, and 0.6 percent by weight of methacrylic acid was cured using potassium stearate catalyzed by guanidines. The recipes and data were as follows:

|  | 1 | 2 | 3 |
|---|---|---|---|
| Rubber | 100 | 100 | 100 |
| Acrawax C | 2 | 2 | 2 |
| N550 black | 65 | 65 | 65 |
| Potassium stearate | 2.8 | 2.8 | 2.8 |
| Guanidine/isocyanate[1] | 0.7 | — | — |
| Guanidine/acylchloride[2] | — | 1.0 | — |
| Dicyandiamide | — | — | 1.0 |
| Press-cure, 20' at 350°F. |  |  |  |
| Tensile, psig | 1780 | 1800 | 1700 |
| Elongation, percent | 140 | 270 | 200 |
| Hardness, Duro A | 68 | 68 | 70 |

-continued

|  | 1 | 2 | 3 |
|---|---|---|---|
| Compression set, percent 70 hours at 300°F. | 35 | 42 | 53 |
| Post-cure, 8 hours at 350°F. Compression set, percent 70 hours at 300°F. | 19 | 30 | 23 |

¹di(tetramethyl guanidine-toluene diisocyanate reaction product
²tetramethyl guanidine)-benzoyl chloride reaction product The example demonstrates the use of guanidine catalysts. Sample 1 employed a guanidine-isocyanate reaction product, and sample 2 a guanidine-acyl chloride reaction product.

EXAMPLE VIII

Acrylate rubbers having both halogen and carboxyl cure sites were vulcanized using potassium stearate or sodium stearate as the curative and amine/carboxylic acid salts as catalyst. The rubber compositions were as follows (in weight percent);

The example demonstrates the utility of the amine/acid salt catalyst. The amine/acid salt must first break down to free the amine for catalysis. Hence, these catalysts are slower acting than the amines used naturally. The rubber in sample 1 is predominantly ethyl acrylate. Therefore, it has higher tensile and lower compression set than does the rubber in samples 2 to 6 which is predominantly n-butyl acrylate. A comparison between samples 3 and 6 demonstrates that potassium stearate and sodium stearate are about equivalent in their ability to cure the acrylate rubbers.

EXAMPLE IX

Acrylate rubbers containing methacrylic acid and vinyl benzyl chloride as the cure site monomers were vulcanized using potassium stearate as the curative and a triethylenediamine/benzoic acid salt as the catalyst. The rubber compositions in weight percent were:

|  | A | B |
|---|---|---|
| Ethyl acrylate | 98.0 | 29.4 |
| n-Butyl acrylate | — | 68.8 |
| Acrylic acid | 0.6 | — |
| Methacrylic acid | — | 0.4 |
| 5-chloroacetoxymethyl-2-norbornene | 1.4 | 1.4 |

|  | 1 | 2 | 3 | 4 | 5 | 6 |
|---|---|---|---|---|---|---|
| Rubber A | 100 | — | — | — | — | — |
| Rubber B | — | 100 | 100 | 100 | 100 | 100 |
| Acrawax C | 2 | 2 | 2 | 2 | 2 | 2 |
| N550 black | 65 | 55 | 55 | 55 | 55 | 55 |
| N881 black | — | 20 | 20 | 20 | 20 | 20 |
| Potassium stearate | 3.0 | 2.8 | 2.8 | 2.8 | — | — |
| Sodium stearate | — | — | — | — | 2.8 | 2.8 |
| t-butylamine/benzoic acid | 0.7 | — | — | — | — | — |
| Triethylene diamine/dibenzoic acid | — | 0.5 | — | — | 0.5 | — |
| N-methyl piperidine/benzoic acid | — | — | 0.95 | — | — | 0.95 |
| 4,4'-dipyridyl propane/dibenzoic acid | — | — | — | 0.86 | — | — |
| Press-cure minutes | 10 | 60 | 60 | 60 | 60 | 60 |
| temperature, °F. | 350 | 307 | 307 | 307 | 307 | 307 |
| Tensile, psig | 1650 | 1000 | 920 | 1000 | 980 | 840 |
| Elongation, percent | 310 | 335 | 450 | 340 | 410 | 490 |
| Hardness, Duro A | 63 | 56 | 53 | 55 | 50 | 49 |
| Compression set, percent 70 hours at 300°F. | 60 | 83 | 87 | 85 | 89 | 91 |
| Post-cure hours | 8 | 20 | 20 | 20 | 20 | 20 |
| temperature, °F. | 350 | 307 | 307 | 307 | 307 | 307 |
| Compression set, percent 70 hours at 300°F. | 38 | 61 | 63 | 62 | 64 | 69 |

|  | A | B |
|---|---|---|
| n-butyl acrylate | 49.2 | 49.2 |
| Methoxyethyl acrylate | 49.2 | 49.2 |
| Methacrylic acid | 0.2 | 0.4 |
| Vinyl benzyl chloride | 1.4 | 1.2 |

The recipes used and data obtained were as follows:

|  | 1 | 2 | 3 | 4 | 5 |
|---|---|---|---|---|---|
| Rubber A | 100 | 100 | 100 | — | — |
| Rubber B | — | — | — | 100 | 100 |
| N326 black | 75 | 75 | 75 | 75 | 75 |
| Acrawax C | 1 | 1 | 1 | 1 | 1 |
| Potassium stearate | 0.9 | 1.6 | 2.0 | 1.5 | 2.0 |
| Triethylenediamine/benzoic acid | 0.5 | 0.5 | 0.5 | 0.5 | 0.5 |
| Press-cure, 30' at 307°F. |  |  |  |  |  |
| Tensile, psig | 1550 | 2000 | 2000 | 1630 | 1700 |
| Elongation, percent | 290 | 230 | 250 | 260 | 230 |
| Hardness, Duro A | 55 | 60 | 60 | 59 | 62 |
| Compression set, percent 70 hours at 300°F. | 86 | 72 | 79 | 79 | 76 |
| Post-cure, 20 hours at 307°F. |  |  |  |  |  |
| Compression set, percent 70 hours at 300°F. | 54 | 36 | 37 | 49 | 43 |

The samples developed excellent properties after the press-cure. The high press-cure compression sets are characteristic of the n-butyl acrylate and methoxyethyl acrylate rubber. The post-cure readily lowered the compression set.

The Examples demonstrate the ability of the acrylate rubbers of this invention to vulcanize without the need of sulfur. The rubbers can also be vulcanized using known cure systems. However, they are quickly and efficiently cured using the acid metal salt and quaternary ammonium salt or amine catalysts. Such compositions have improved vulcanizate compression set values. They obtain a given state of cure faster than previously known compositions, thereby resulting in increased productivity.

EXAMPLE X

A rubber masterbatch was prepared using 100 parts by weight of an acrylate rubber, 55 parts by weight of N550 carbon black, 20 parts by weight of N881 carbon black, and 1 part by weight of Acrawax C. The acrylate rubber used contained 77.8 percent by weight of n-butyl acrylate, 20.8 percent by weight of ethyl acrylate, 1.1 percent by weight of vinyl benzyl chloride, and 0.3 percent by weight of methacrylic acid. Portions of the masterbatch were then mixed with curatives and heated in a B.F.G. Cone Curometer at 350°F. The curatives were used in parts by weight based upon 100 parts by weight of the acrylate rubber. The following table gives the cure recipes in parts by weight and the torque data of the samples:

|  | 1 | 2 | 3 |
|---|---|---|---|
| Rubber masterbatch | 176 | 176 | 176 |
| Potassium salt of Gafac PE-510[1] | 2.8 | — | — |
| Sodium salt of Gafac PE-510[1] | — | 2.8 | — |
| Sodium salt of cinnamic acid | — | — | 1.4 |
| Fixanol[2] | 1.0 | 1.0 | 1.0 |
| Torque, initial | 7 | 7 | 8 |
| Torque after 26 minutes at 350°F. | 18 | 12 | 28 |

[1]alkylphenoxy poly(ethyleneoxy)ethyl phosphate
[2]dodecyl pyridium bromide, 50% by weight on precipitated silica The rubber masterbatch, without a curative present, shows no torque increase upon heating. After 26 minutes, all of the samples were cured elastomers. The Example demonstrates the use of alkali metal salts of organo-phosphoric acids as curatives for the acrylate rubbers. Sample 3 shows the use of an alkali metal salt of an unsaturated carboxylic acid as a curative.

We claim:
1. A composition of (1) a rubber consisting essentially of (a) from about 40 percent to about 99.8 percent by weight of an acrylate or mixtures of acrylates of the formula

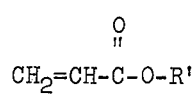

wherein R' is selected from the group consisting of an alkyl radical containing 1 to 18 carbon atoms, an alkoxyalkyl, an alkylthioalkyl, and a cyanoalkyl radical each containing 2 to about 12 carbon atoms, (b) from about 0.1 percent to about 30 percent by weight of a halogen-containing monomer selected from the group consisting of vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-($\alpha$-chloroacetoxymethyl)-2-norbornene, and 5-($\alpha,\beta$-dichloropropionylmethyl)-2-norbornene, (c) from about 0.1 percent to about 20 percent by weight of a carboxyl-containing monomer, and (d) up to 35 percent by weight of a copolymerizable monomer containing a terminal vinylidene group selected from the group consisting of vinyl acetate, methyl methacrylate, ethyl methacrylate, styrene, acrylonitrile, acrylamide, divinyl benzene, and diethylene glycol diacrylate, and (2) a cure system consisting essentially of from about 0.5 part to about 7 parts by weight based upon 100 parts by weight of the rubber of an alkali metal salt of an acid selected from the group consisting of carboxylic acids containing 2 to about 24 carbon atoms and organophosphoric acids wherein the organophosphoric acid alkali metal salts have the structure $$(RO)_{y}PO_{z}OM$$

wherein M is an alkali metal, $y = 1$ or 2, $z = 1$ or 2, and $y + z = 3$, and R is selected from the group consisting of an alkyl radical containing 1 to 24 carbon atoms, an aryl radical containing 6 to 24 carbon atoms, and an alkylphenoxy poly(ethyleneoxy)ethyl radical.

2. A composition of claim 1 wherein M is potassium or sodium.

3. A composition of claim 1 wherein (1) is a rubber consisting essentially of (a) from about 65 percent to about 99.6 percent by weight of an acrylate or mixtures of acrylates wherein R' is selected from the group consisting of alkyl radicals containing 1 to about 10 carbon atoms and alkoxyalkyl radicals containing 2 to about 8 carbon atoms, (b) from about 0.2 percent to about 15 percent by weight of the halogen-containing monomer, (c) from about 0.2 percent to about 10 percent by weight of a carboxyl-containing monomer, and (d) up to about 10 percent by weight of a copolymerizable monomer containing a terminal vinylidene group recited in claim 1.

4. A composition of claim 3 wherein (a) is selected from the group consisting of ethyl acrylate, n-butyl acrylate, methoxy ethyl acrylate and ethoxy ethyl acrylate, (b) is selected from the group consisting of vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene, (c) is selected from the group consisting of acrylic acid, methacrylic acid, and itaconic acid, and (d) is selected from the group consisting of vinyl acetate, methyl methacrylate, ethyl methacrylate, styrene, acrylonitrile, acrylamide, and diethylene glycol diacrylate.

5. A composition of claim 4 wherein (a) is ethyl acrylate and (c) is methacrylic acid.

6. A composition of claim 3 wherein (2) is used at a level from about 1 part to about 5 parts by weight based upon 100 parts by weight of the acrylate rubber, and where the acid is an alkyl or aromatic monocarboxylic acid containing from about 6 to about 20 carbon atoms.

7. A composition of claim 6 wherein the said monocarboxylic acid is an alkyl monocarboxylic acid.

8. A composition of claim 7 wherein the alkali metal is selected from the group consisting of potassium and sodium.

9. A composition comprising (1) a rubber consisting essentially of (a) from about 40 percent to about 99.8 percent by weight of an acrylate or mixtures of acrylates having the formula

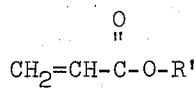

wherein R' is selected from the group consisting of an alkyl radical containing 1 to 18 carbon atoms, an alkoxyalkyl radical, alkylthioalkyl radical, and a cyanoalkyl radical each containing 2 to about 12 carbon atoms, (b) from about 0.1 percent to about 30 percent by weight of a halogen-containing monomer selected from the group consisting of vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-($\alpha$-chloroacetoxymethyl) 2-norbornene, and 5-($\alpha,\beta$-dichloropropionylmethyl)-2-norbornene, (c) from about 0.1 percent to about 20 percent by weight of a carboxyl-containing monomer, and (d) up to 35 percent by weight of a copolymerizable monomer containing a terminal vinylidene group selected from the group consisting of vinyl acetate, methyl methacrylate, ethyl methacrylate, styrene, acrylonitrile, acrylamide, divinyl benzene, and diethylene glycol diacrylate, and (2) a cure system consisting essentially of (i) from about 0.5 part to 7 parts by weight based upon 100 parts by weight of the rubber of an alkali metal salt of an acid selected from the group consisting of carboxylic acids containing 2 to about 24 carbon atoms and organophosphoric acids wherein the organophosphoric acid alkali metal salts have the structure $$(RO)_{\overline{y}}PO_nM$$

wherein M is an alkali metal, $y = 1$ or 2, $z = 1$ or 2, and $y + z = 3$, and R is selected from the group consisting of an alkyl radical containing 1 to 24 carbon atoms, an aryl radical containing 6 to 24 carbon atoms, and an alkylphenoxy poly(ethyleneoxy)ethyl radical, and (ii) a catalyst used at a level from about 0.01 part to about 5 parts by weight per 100 parts by weight of rubber, and wherein said catalyst is selected from the group consisting of quaternary ammonium salts and amines that have a dissociation constant of below 10.

10. A composition of claim 9 wherein the quaternary ammonium salts have structure

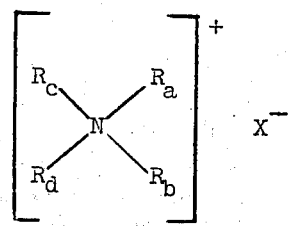

wherein $R_a$, $R_b$, $R_c$ and $R_d$ are hydrocarbon radicals selected from the group consisting of alkyl, aryl, alkaryl, and aralkyl radicals containing 1 to 18 carbon atoms, or wherein two or three of the $R_a$, $R_b$, $R_c$ and $R_d$ radicals form with the nitrogen atom a heterocyclic structure containing 3 to 8 carbon atoms selected from the group consisting of C, N, O, and S atoms, at least two of which are C; and X is an anion from an organic or inorganic acid, wherein the acidic hydrogen is attached to a halogen or an oxygen atom.

11. A composition of claim 10 wherein X is selected from the group consisting of Cl$^-$, Br$^-$, I$^-$, HSO$_4^-$, H$_2$PO$_4^-$, RCOO$^-$, ROSO$_3^-$, RSO$_3^-$, and ROPO$_3$H$^-$, where R is an alkyl or alkaryl radical containing 1 to 18 carbon atoms.

12. A composition of claim 9 wherein the amine is selected from the group consisting of secondary amines, tertiary amines and guanidines.

13. A composition of claim 12 wherein the secondary amines and tertiary amines are cyclic methyleneamines or heterocyclic amines containing 3 to 8 atoms in the ring.

14. A composition of claim 12 wherein the amine is added as an amine/acid salt where the acid is selected from the group consisting of halogen acids, phosphoric acid, partial phosphoric acid ester, partial sulfuric acid ester, and carboxylic acids.

15. A composition of claim 14 wherein the acid is a carboxylic acid selected from the group consisting of monocarboxylic fatty acids and aromatic acids containing from 6 to about 20 carbon atoms.

* * * * *